United States Patent

[11] 3,625,607

| [72] | Inventor | Frank R. Bravenec<br>Houston, Tex. |
|---|---|---|
| [21] | Appl. No. | 826,805 |
| [22] | Filed | May 22, 1969 |
| [45] | Patented | Dec. 7, 1971 |
| [73] | Assignee | Warren Childers |

[54] AUTOMATIC FOCUSING CAMERA
11 Claims, 3 Drawing Figs.

[52] U.S. Cl. ..................................... 355/56,
355/59, 355/62
[51] Int. Cl. ............................................ G03b 27/34
[50] Field of Search ............................. 355/56, 59, 62

[56] References Cited
UNITED STATES PATENTS

| 2,618,209 | 11/1952 | Silent | 355/59 X |
|---|---|---|---|
| 2,655,834 | 10/1953 | Pennington | 355/56 |
| 3,052,156 | 9/1962 | Blatherwick | 355/62 |
| 3,211,053 | 10/1965 | Wanielista et al. | 355/59 |

*Primary Examiner*—Samuel S. Matthews
*Assistant Examiner*—Richard A. Wintercorn
*Attorney*—Donald Gunn

ABSTRACT: A preferred embodiment of an automatic focusing device for a camera system which gives the necessary magnification. It includes a pair of servo driven self-nulling bridge circuits. The physical position of the lens, image source and image plane is encoded by slide rheostats.

PATENTED DEC 7 1971  3,625,607

Frank R. Bravenec
INVENTOR

BY Donald Gunn

ATTORNEY

AUTOMATIC FOCUSING CAMERA

SUMMARY OF PROBLEM AND SOLUTION

Photographic apparatus typically includes a lens system which must be focused to obtain a sharp image on the photographic medium. This is a particularly significant problem in laboratory equipment, such as large size cameras, enlargers, and other equipment which includes a lens system. By lens system, reference is made to the rare situation of a single lens and includes the more common arrangement of a number of individual lens which are grouped together in a single lens holder to define the lens system. The present invention applies to a lens system of all sizes and shapes, and degrees of complexity. Moreover, the present invention encompasses camera apparatus, enlargers, and other equipment without regard to the particular nature of the equipment.

The problem of focusing a lens system to obtain a sharp image is in and of itself sufficient to require measurable experience by the operator. However, when this is coupled with the added requirement of obtaining a particular magnification ratio, the problem is further compounded. For example, a given piece of copy may be enlarged or reduced by measurable factors. In this event, the adjustment of the lens system and the image material to obtain proper focusing is critical, if not impossible, for all but experienced operators. Even then, experienced operators have difficulties in focusing and obtaining the desired magnification ratio to produce a sharp image on the photographic medium.

The present invention solves the above problem automatically by providing an apparatus which includes linear resistor strips immediately adjacent to and cooperative with the support bed of camera equipment along which the lens system and the image support means travel. The precise position of the lens system and the image is defined by the resistance measured along the resistance strips in the equipment. These resistive values are incorporated in appropriate bridge circuits as will be described and the bridge circuits, on inbalance, provide driving signals to differential amplifiers communicating the servo motors. Them motors move the image and the lens system to adjust the resistances in the bridge circuit. As the bridge circuit approaches a null, the motors stop driving the image and the lens system. The apparatus can be adjusted to obtain a desired magnification or reduction in size, and this is always accomplished with sharp and accurate focusing without any activity on the part of the operator.

While many objects and advantages of the present invention may be set forth, a description of the preferred embodiment of the present invention will be set forth hereinafter, referring to the included drawings, wherein.

Figure 1:
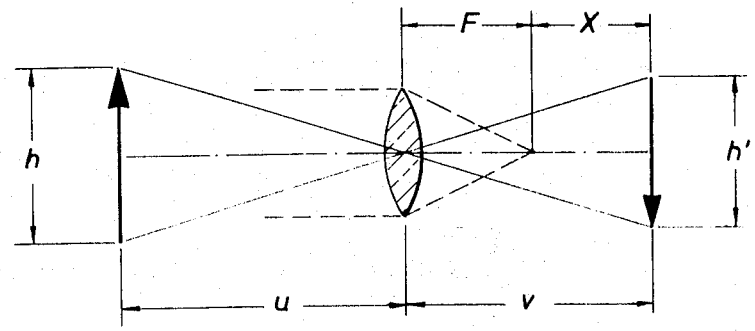
FIG. 1 is a sketch of a simplified lens system and image which is helpful in explaining the theory of the present invention.

Attention is first directed in the drawings to FIG. 1. FIG. 1 sets forth an exemplary lens system which provides some basic definitions as an assistance to an understanding of the present invention. At the left of FIG. 1, an object having a height of "$h$" is illuminated adjacent a lens which has a focal length of "$F$" to form an inverted image at the right which has a height of "$h'$." The symbols "$u$," "$v$," "$x$," and "$F$" represent known measurements in FIG. 1. Briefly a sharp focus is obtained when the reciprocal of the focal length is equal to the sum of the reciprocals of the distances from the lens to the subject and to the image. Additionally, the magnification ratio is simply the ratio of "$h'$" to "$h$." These two relationships are the relationships to be controlled by the present invention, and referring to FIG. 1 from time to time hereinafter, the apparatus will be explained to show achievement of these two relationships while at the same time the structural arrangements will be described in detail.

Figure 2:
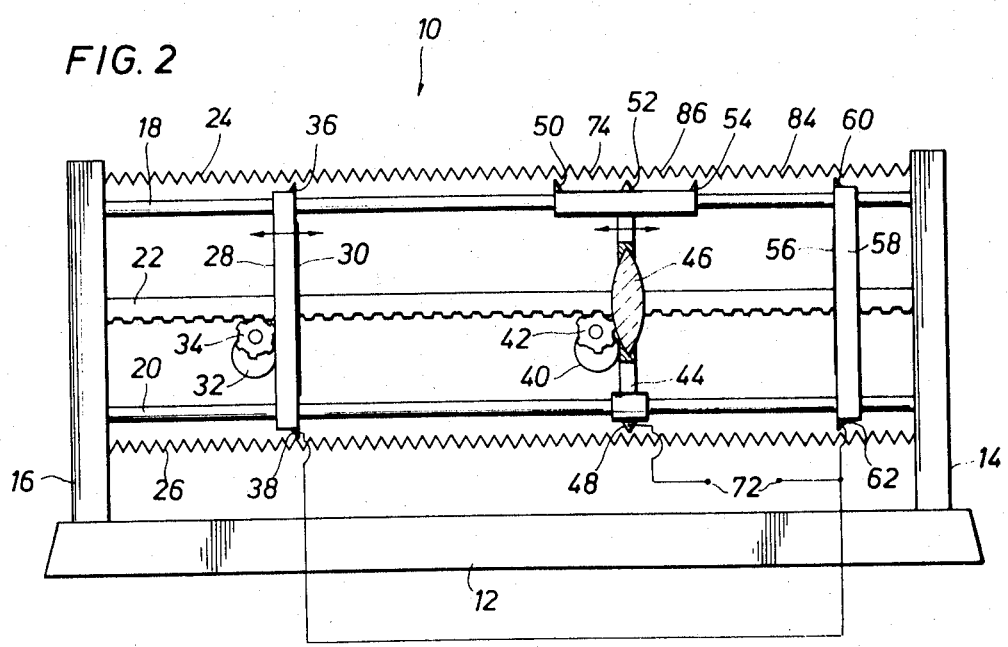
FIG. 2 shows a process camera including a movable lens system and copy holder, and incorporating the apparatus of the present invention for adjusting the lens system and copy to obtain the desired magnification setting and a sharp focus; and, FIG. 3 is a schematic wiring diagram incorporating the circuitry shown in FIG. 2 for moving the lens system and copy holder to the desired positions.

In FIG. 2, a process camera apparatus is indicated by the numeral 10. The particular nature of the apparatus is subject to variation. That is, it may be an enlarger or a large copy camera, or any other equipment utilizing a lens system in which a sharp focus is required and variation in magnification may be accommodated. The process camera 10 includes a base member 12 which supports an upstanding member 14 at the right and an additional parallel upstanding member 16 at the left. The members 14 and 16 are rigid members which support parallel bars 18 and 20 on which the apparatus travels. The apparatus resembles the bed on a lathe to the extent that rigidity in the apparatus is required. Of course, the structure need not be quite that heavy, but in any event, the structure should have some rigidity as it is desirable to maintain the image, the copy or photographic medium, and the lens system in planes, parallel one with the other.

A rack 22 extends the length of the apparatus and provides suitable gear teeth for translation of the movable apparatus as will be described. The precise details of the rack 22 are clearly subject to variation. Moreover, it may be found helpful to place a duplicate of the rack 22 on the opposite side of the equipment and to utilize double shaft drive motors with a gear on each end for engaging both racks. This is a matter of design detail and is not considered pertinent to the present disclosure.

A first resistive slide wire 24 is formed on one side of the apparatus and a second resistor slide wire is formed on the other side and is indicated by the numeral 26. The particular location of the slide wires 24 and 26 with respect to the bed of the equipment is subject to variation. Moreover, they may be adjacent to one another or spaced on opposite sides of the equipment. Any arrangement is satisfactory as long as the resistive slide wires cooperate with the contacts to be described hereinafter and the appropriate resistive values are determined. The slide wires 24 and 26 are used in the manner to be described to locate the lens system, the photographic medium, and the copy.

The copy is actually carried on a platen 28. The copy is indicated in edge view in FIG. 2 by the numeral 30. The platen 28 is transported to the right and left in the apparatus 10 in response to operation of a motor 32 which rotates a gear 34 engaged with the rack 22. It will be appreciated that the motor 32 is geared down by a suitable gear box integrally constructed with the motor 32. Inasmuch as combination motor and gear box arrangements are believed well known in the art, it is believed that this is a sufficient disclosure to indicate how the gear 34 is rotated. As mentioned before, if parallel racks 22 are envisioned, the motor 32 is preferably equipped with duplicate drive shafts and duplicate drive gears engaged with each of the racks to maintain the platen 28 parallel during its movement. Again, the exact mechanical arrangement of the present invention is subject to variation and has been described as supporting structure herein.

The platen 28 which supports the image copy 30 also includes a wiper 36 which is contacted to the resistance slide wire 24 at a particular point. Further, the slide wire 26 is contacted by an additional wiper 38. The two wipers, when contacted against the resistance slide wires in question, convert the physical location of the platen 28 to a resistance measurement as will be described. Preferably, the wipers are conductive contacts having circuit connections as will be described in regard to FIG. 3.

The mechanical apparatus shown in FIG. 2 further includes a motor 40 having an appropriate gear box for rotation of a drive gear 42 which is engaged with the rack 22. The motor 40 is connected to the lens support indicated by the numeral 44 which provides structural mounting for the lens system indicated by the numeral 46. In FIG. 2, the lens is indicated as a single lens. However, the lens system may incorporate several individual lens which cooperate to achieve a desired photographic result notwithstanding nodal point corrections which may be necessary. Precise nature of the lens system is subject to variation. Hence, the simplified representation of FIG. 2 is not intended as a limitation on the present disclosure.

The lens holder 44 is similar to the platen 28 in that it preferably moves parallel to the platen and its location is indicated by a wiper 48 which is contacted on the slide wire 26. Additionally, wipers 50, 52 and 54 are contacted against the slide wire 24. The spacing of the wipers will be detailed hereinafter, but it is sufficient to note presently that the four wipers associated with the lens system translate the two slide wires in response to operation of the motor 40.

The photographic medium is indicated by the numeral 56 and is carried on a platen 58. The platen 58 may be hand movable, but there is no need in providing the motive apparatus similar to that described above. In actuality, the platens 28 and 58 may be reversed in function if it is desirable to move the photographic medium automatically as taught by the present invention. The platen 58 is supported in a parallel plane in the apparatus as shown in FIG. 2 and is contacted against the slide wire 24 by a wiper indicated by the numeral 60. Another wiper 62 contacts the slide wire 26. The position of the photographic medium 56 is indicated electrically by the location of the wipers 60 and 62 on the respective slide wire strips.

While the foregoing describes the mechanical system for locating the copy 30, the lens system 46, and the photographic medium 56, the mode of operation of the motors 32 and 40 has yet to be described. For this, attention is next directed to FIG. 3 of the drawings.

Figure 3:
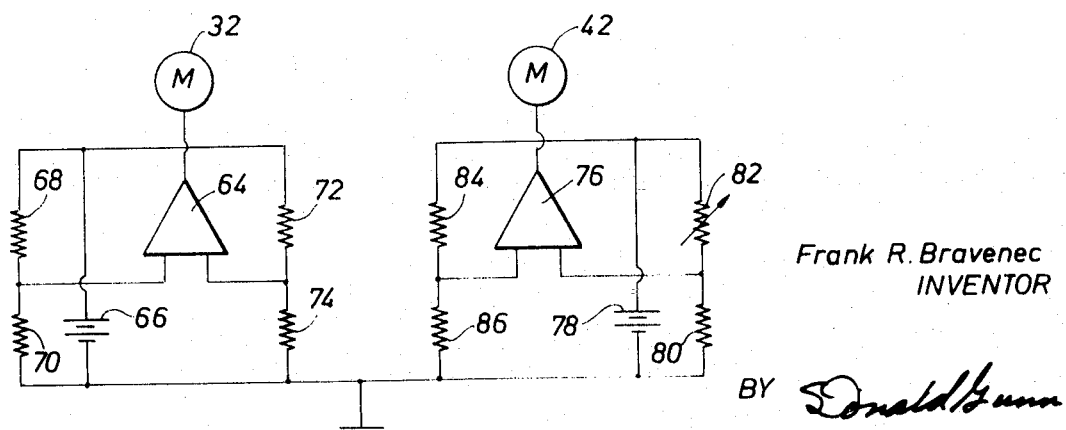

In FIG. 3, the motor 32 is indicated schematically as being driven by a servo amplifier 64. The servo amplifier is made responsive to a bridge circuit. A voltage source 66 is connected across the bridge circuit and any voltage difference across the bridge is input to the servo amplifier 64. When the signal is present, the motor is operated. However, when the signal input to the amplifier 64 indicates a null of the bridge, the motor is no longer operated because the bridge is balanced. The numerals 68 and 70 indicate a pair of resistors of convenient values. The numeral 72 indicates the resistance controlled by the lens system 46, the photographic medium 56 and the image 30 shown in FIG. 2. More specifically, it is the resistance measured between the wipers 48 and 62 on the strip 26 combined in parallel with the resistance between wipers 38 and 48. It is the resistance measured across the terminal 72 shown in FIG. 2. The numeral 74 indicates the last resistor of the bridge and represents the resistance measured between the wipers 50 and 52. Inasmuch as these wipers are a fixed distance from one another, the distance is made proportional to the focal length of lens system, or, referring to FIG. 1, the resistance is made proportional to the distance "F" shown therein. That portion of the resistive slide wire 24 located between the two wiper arms is indicated by the numeral 74 in FIG. 2.

Attention is next directed to the motor 40. It is driven by a servo amplifier 76 which is connected across the points of a bridge having a voltage source 78. One leg of the bridge is indicated by the numeral 80 and is preferably a standard resistor of values selected to equal the resistors 68 and 70 previously described. The numeral 82 indicates a variable resistor which is used to provide the magnification ratio desired. As pointed out in the description of the problem which the present invention solves, it is difficult to provide accurate focus in process camera equipment and to simultaneously adjust for desired magnification ratio. The variable resistor 82 is preferably equal to the resistor 80 for a magnification ratio of one. Clearly, a larger ratio utilizes an increased resistance and a smaller magnification ratio requires an equally proportionate reduction in resistance. In practice, the resistors 68, 70 and 80 are preferably constructed of the same material as the slide wires 24 and 26, and are preferably maintained at the same temperature to stabilize the present invention against variations in temperature.

The numeral 84 indicates a resistor in the bridge circuit for operation of the motor 40 which is a portion of the resistive slide wire 24. It is that portion of the slide wire between the wipers 54 and 60. Referring to FIG. 1, the resistance is proportional to the distance "x" shown in FIG. 1, or the distance from the image to the focal point as described above. Hence, conductors are connected to the wiper 54 and to the wiper 60 to provide the resistive measurement to the bridge circuit. The last resistor of the bridge is indicated by the numeral 86 and is that portion of the slide wire 24 between the wipers 52 and 54. Inasmuch as the wipers 52 and 54 are fixed with a distance between one another, this distance corresponds to the focal length of the lens system 46 or the distance "F" shown in FIG. 1.

In operation, suppose for sake of description that the variable resistor 82 is adjusted to provide a magnification ratio of one. In this event, the variable resistor is adjusted so that its resistance is equal to that of the resistor 80. The bridge circuit responds and will seek a bridge balance such that the magnification ratio equals the ratio of "x" to "F" as shown in FIG. 1. As will be recalled, this ratio correctly gives the magnification ratio of the lens system. As described herein, the resistance 84 is proportional to the distance "x" in FIG. 1, and the resistance 86 is proportional to the focal length of the lens system 46. UPon movement of the lens system 46, clearly the adjustment of the image and image source is altered so that a sharp focus is required. Hence, the motor 32 is operated to adjust the location of the image source 30 to obtain a sharp focus. Referring to FIG. 3, it will be noted that the resistances 68 and 70 are fixed and equal resistors. However, the resistances 72 and 74 respond to movement of the lens system in the following manner.

In the preferred embodiment, the resistances 68 and 70 are preferably equal. Consequently, a bridge balance is achieved and the motor 32 ceases operation when the resistances 72 and 74 are equal. The resistor 74 is fixed inasmuch as the wipers 50 and 52 are a fixed distance apart. As will be recalled, this resistance is proportional to the focal length of the lens system which is a fixed or known factor for a given process camera 10. The resistor 72 is determined by the parallel addition of the resistances between the wipers 48 and 62 and the resistance between the wipers 38 and 48. Viewing FIG. 2, the above mentioned wipers define the distances "u" and "v" as shown in FIG. 1. The terminals 72 shown in FIG. 2 are connected such that these resistances are added as parallel resistors.

From the foregoing, it will be understood that the resistance shown at 72 in FIG. 3 is in fact a parallel resistive circuit including two portions of the resistive strip 26. That is, the slide wire 26 is divided into portions determined by the wipers 38, 48 and 62, contacted against the resistive strip. Referring to the earlier portions of the description of the present invention, it will be recalled that the reciprocal of the focal length is equal to the sum of the reciprocals of the distances "u" and "v" as shown in FIG. 1. This is termed in the lens law. The law is accommodated by the relationship of the resistors 72 and 74 shown in FIG. 3 which have the values derived from the resistive slide wires 24 and 26 as shown in FIG. 2.

The foregoing is directed to a preferred embodiment of the present invention. However, many variations and alterations may be adapted as will be appreciated. While FIG. 2 is directed to one structural embodiment of the invention, it will be recognized and understood that the arrangement of the apparatus is subject to variation over a wide range. More particularly, the structural framing and alignment bars 18 and 20 may be altered in any manner desired. Likewise, the mounting of the support platens 28 and 58 may be likewise varied. The drive mechanisms for the preferred embodiment preferably incorporate the servo motors 32 and 40 as shown in the drawings although other arrangements may be adopted. Particularly, the lens system 46 is a generic representation of any particular lens system, and as a consequence of this, the apparatus may be used with any lens system required for the process camera equipment.

The classic bridge circuit is particularly suited for a known seeking and balancing circuit. However, other forms of circuitry may be adapted for the purpose of driving the respective servo motors to the desired position in response to indications obtained from the physical location of the image source, the photographic medium, and the lens system.

While the foregoing describes the preferred embodiment of the present invention and the many variations noted above may be adopted, reference is made to the claims appended hereto.

What is claimed is:

1. An apparatus for positioning a lens system image source and a photographic medium to obtain a sharp image and a desired image magnification, comprising:
   a. a first bridge circuit;
   b. a second bridge circuit;
   c. sliding resistive position indicator means adapted to be connected to and positioned by a lens system, image source and photographic medium of an associated equipment, said means forming signals indicative of the positions of the connected equipment;
   d. circuit means connected to said indicator means and to said bridge circuits such that at least one leg of each bridge circuit is comprised at least partially of said indicator means;
   e. said first bridge circuit implementing the equation
   $$1/F = 1/V + 1/u$$
   Where:
   $F$—Focal length of the lens system
   $u$—Distance to the image source
   $V$—Distance to the photographic medium;
   f. said second bridge circuit implementing the equation
   $$M = h'/h$$
   Where:
   $M$—magnification ratio
   $L'$—Size of the image at the photographic medium
   $h$—Size of the image at the image source; and,
   g. motive means adapted to move at least one of the image image source, photographic medium, or lens system in response to the inbalance of at least one of said bridge circuits.

2. The invention of claim 1 including a second motive means adapted to be connected to one of the remaining of the image source, photographic medium, or lens system, and wherein said first bridge circuit is connected on, and on inbalance thereof, drives said first motive means, and said second bridge circuit is connected to said second motive means and drives it on inbalance.

3. The invention of claim 1 wherein said first bridge circuit has four legs, two of which are standard impedance values and two of which are determined by said sliding resistive indicator means.

4. The invention of claim 3 wherein one of said legs is determined by a length of measure of the associated equipment proportional to the focal length of the lens system thereof, and the other is given by the parallel combination of the two measures of length of the associated equipment which are the distances from the image source and the photographic medium to the lens system.

5. The invention of claim 1 wherein said second bridge circuit has four legs, one of which is a standard impedance, the second thereof being an adjustable potentiometer having a range of values, one of the values thereof corresponding to a predetermined magnification ratio and other values thereof corresponding to different magnification ratios, the third leg thereof corresponding to the distance from the image formed by the lens system of the associated equipment to the photographic medium thereof, and the last leg thereof corresponding to the focal length of the lens system of the associated equipment.

6. The invention of claim 1 wherein said sliding resistance position indicator means includes first and second linear slide wire resistors positioned along the associated equipment to indicate the position of the image source, the lens system, and the photographic medium thereof.

7. The invention of claim 6 wherein slidable contacts are carried on said indicator means for additionally indicating a distance corresponding to the focal length of the lens system of the associated equipment.

8. The invention of claim 1 including an elongate slide wire resistive circuit component being contacted by a plurality of contacts, one of said contacts being adapted to be moved by and indicative of the position of the image source, a second being adapted to be moved by and indicative of the position of the lens system, and a third being adapted to be moved by and indicative of the position of the photographic medium.

9. The invention of claim 8 wherein the three contacts are connected to define two portions of said resistive slide wire which are connected in parallel to one another and are thusly connected into said first bridge circuit.

10. The invention of claim 1 wherein said first bridge circuit is connected to a differential amplifier and any inbalance thereof forms an output signal at said differential amplifier, and including connection with said motive means which is mechanically connected to either the image source or photographic medium of the associated equipment.

11. The invention of claim 1 wherein said second bridge circuit is connected to the input of a differential amplifier and any inbalance thereacross is amplified and forms an output at said differential amplifier, and said differential amplifier is further connected to a second motive means which is adapted to be connected with the lens system of the associated equipment for manipulation thereof which respect to the image source or the photographic medium thereof.

* * * * *